(12) United States Patent
Kwakye et al.

(10) Patent No.: US 11,408,350 B2
(45) Date of Patent: Aug. 9, 2022

(54) ELECTRICAL HARNESS

(71) Applicant: SAFRAN AIRCRAFT ENGINES, Paris (FR)

(72) Inventors: George Alex Kwakye, Moissy-Cramayel (FR); Benoit Marie Bernard Kieffer, Moissy-Cramayel (FR); Jacques Paul Michel Gauvrit, Moissy-Cramayel (FR); Jean-François Jean-Paul Clément Schielin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 370 days.

(21) Appl. No.: 16/632,685

(22) PCT Filed: Jul. 23, 2018

(86) PCT No.: PCT/FR2018/051879
§ 371 (c)(1),
(2) Date: Jan. 21, 2020

(87) PCT Pub. No.: WO2019/020919
PCT Pub. Date: Jan. 31, 2019

(65) Prior Publication Data
US 2020/0224593 A1    Jul. 16, 2020

(30) Foreign Application Priority Data
Jul. 24, 2017  (FR) ...................................... 1757004

(51) Int. Cl.
*F02C 7/25*    (2006.01)
*H01B 7/00*    (2006.01)
(Continued)

(52) U.S. Cl.
CPC ............. *F02C 7/25* (2013.01); *H01B 7/0045* (2013.01); *H01B 7/295* (2013.01); *H01H 37/52* (2013.01); *H01R 4/72* (2013.01)

(58) Field of Classification Search
CPC ... F02C 7/25; F02C 7/32; B60R 16/03; F01D 17/06; F01D 21/003; H01B 7/0045; H01B 7/295; H01H 37/52; H01R 4/72
See application file for complete search history.

(56) References Cited

U.S. PATENT DOCUMENTS 5,757,261 A * 5/1998 Becher ............... H01H 37/5427
                                                337/380
6,359,443 B1   3/2002 Endo et al.
(Continued)

FOREIGN PATENT DOCUMENTS

FR           2901423         11/2007

OTHER PUBLICATIONS

International Patent Application No. PCT/FR2018/051879, International Search Report and Written Opinion dated Nov. 7, 2018, 11 pgs. [relevance found in citations and English translation of International Search Report].

*Primary Examiner* — Jason H Duger
(74) *Attorney, Agent, or Firm* — Lathrop GPM LLP

(57) ABSTRACT

Electrical harness for a turbomachine, comprising a first termination connected to an apparatus (3) capable of emitting an electrical signal, and a second termination connected to a signal processing apparatus (4), characterised in that it comprises an electronic circuit for filtering the signal, said circuit comprising at least one electronic component associated with an operating temperature threshold, and one thermally triggered electrical interruption means connected in series or in parallel with said electronic component, said electrical interruption means being capable of changing from an open state in which a current cannot flow through (Continued)

it, to a closed state in which a current can flow through it, or reciprocally from a closed state to an open state, from a tripping temperature lower than or equal to the operating temperature threshold of said electronic component.

20 Claims, 3 Drawing Sheets

(51) Int. Cl.
*H01B 7/295* (2006.01)
*H01H 37/52* (2006.01)
*H01R 4/72* (2006.01)

(56) References Cited

U.S. PATENT DOCUMENTS

| | | | |
|---|---|---|---|
| 6,597,273 B2 * | 7/2003 | Takeda | H01H 37/5427 |
| | | | 337/333 |
| 7,358,740 B2 * | 4/2008 | Davis | H01H 37/54 |
| | | | 337/14 |
| 2002/0070041 A1 | 6/2002 | Dewilde | |
| 2003/0231013 A1 | 12/2003 | Faymon et al. | |
| 2005/0122201 A1 * | 6/2005 | Davis | G08B 13/1681 |
| | | | 337/337 |
| 2014/0102782 A1 | 4/2014 | Toyama | |

\* cited by examiner

ELECTRICAL HARNESS

CROSS-REFERENCE TO RELATED APPLICATIONS

This application is a 35 U.S.C. § 371 filing of International Application No. PCT/FR2018/051879 filed Jul. 23, 2018, which claims the benefit of priority to French Patent Application No. 1757004 filed Jul. 24, 2017, each of which is incorporated herein by reference in its entirety.

FIELD OF THE INVENTION

The present invention concerns the field of electrical harnesses, more particularly that of electrical harnesses equipping turbomachine.

BACKGROUND OF THE INVENTION

An electrical harness is an electronic device that carries electrical signals between different pieces of equipment. In the case of a turbomachine equipped with a computer and numerous sensors, electrical harnesses are placed between the computer and the sensors so as to convey—to the computer—the measurements taken by these sensors.

In particular, so-called double-body turbomachine comprising a low pressure body and a high pressure body are equipped with sensors to measure the rotational speed of the low pressure body, called N1 speed, and the rotational speed of the high pressure body, called N2 speed.

These N1 and N2 speed sensors can be disturbed by vibrations of the turbomachine. The speed measurement signals can then be interfered with by noise peaks which can lead to false engine failure detection. This interference may only be noticeable at certain operating speeds, e.g. when starting the engine.

In order to reduce the noise level of the signal, it is possible to filter the signal using an analog filter, also called an electronic filter circuit in the following, which can be integrated into an electronic counting circuit, as illustrated for example in the US patent application 20030231013.

This electronic counting circuit is generally integrated into the computer known as FADEC (Full Authority Digital Engine Control Electronic) of the turbomachine.

The computer is usually located in the nacelle surrounding the turbomachine fan. This is an electronic engine control system. In most cases, all the electrical harnesses and the computer are located in the fire zone. Fire zones are defined as areas of the turbomachine in which a fire is likely to occur. These electrical harnesses are generally provided with thermal protection means or thermal insulating layers in order to be resistant in severe temperature conditions, as illustrated by the French patent application FR 2901423. The computer usually includes means of cooling as well as means of fire detection.

In order to avoid redesigning the computer, it is preferable to integrate the filtering electronic circuit into an electrical harness carrying the signals to be transmitted to the computer. It is also not desirable to modify a sensor to incorporate an electronic filter circuit because the mass of the sensor must be limited so that its position in the turbomachine remains sufficiently stable under the influence of engine vibrations.

The integration of an electronic filter circuit into an electrical harness raises several difficulties. In a configuration where the entire harness is in a fire zone, the electronic filter circuit integrated in the harness must process OFR (Operating Fire Resistant) signals carried by the harness, which must remain available even in the event of a fire. Signals are said to be OFR when they are available in the event of a fire for a minimum of five minutes. In practice, the electrical harness must hold the fire for at least five minutes. The electrical components of the electronic filter circuit integrated in the harness should then be able to withstand 1100° C. according to ISO 2685: 1998(E) which is not the case in practice.

It is not necessary for the electronic filter circuit to be functional after five minutes of fire, even if the temperature of the environment returns to room temperature. The loss of functionality of the electronic filter circuit is acceptable provided that it does not hinder the transmission of the signal, even noisy, carried by the harness to the computer.

A problem is therefore the integration of an electronic filter circuit that can contain low-temperature electrical components in a fire-resistant electrical harness, without compromising, in the event of fire, the transmission of the OFR signals carried by the harness. These signals may be degraded in the event of fire but must be transmitted to the computer, and must not be critically degraded beyond five minutes of exposure to fire.

SUMMARY

The present invention relates firstly to an electrical harness for a turbomachine, comprising a first termination connected to an apparatus capable of emitting an electrical signal, and a second termination connected to a signal processing apparatus, characterised in that it comprises an electronic circuit for filtering the signal, said circuit comprising at least one electronic component associated with an operating temperature threshold, and at least one thermally triggered electrical interruption means connected in series or in parallel with said at least one electronic component, said at least one electrical interruption means being capable of changing from an open state in which a current cannot flow through it, to a closed state in which a current can flow through it, or reciprocally from a closed state to an open state, from a tripping temperature lower than or equal to the operating temperature threshold of said at least one electronic component, so as to continue to ensure electrical transmission between the first termination and the second termination if the temperature becomes higher than said tripping temperature.

Thus, the failure of a component associated with an operating temperature threshold does not prevent the transmission of the electrical signal to the computer since the thermal trip switch has a trip temperature less than or equal to the operating temperature threshold of the electronic component.

Depending on a particular feature, the means of electrical interruption is selected from the following list: thermal switch, fuse and thermal circuit breaker.

A thermal switch is used to switch from an open state to a closed state allowing the current to flow. A fuse or thermal circuit breaker is used to switch from a closed to an open state and is used to prevent a short circuit.

Depending on a particular characteristic, the electronic signal filter circuit consists of a resistor and a capacitor connected in series. This arrangement provides a low-pass RC filter for filtering the high frequencies of the electrical signal. Other types of filters can be used (high pass, band pass . . . ) depending on the type of filtering desired.

According to a special feature, the resistor is connected in parallel with a thermal switch. This configuration prevents signal loss in the event that the resistor has a failure mode equivalent to an open circuit.

Depending on a particular characteristic, the capacitor is connected in series with a fuse or with a thermal circuit breaker. This prevents a short circuit in case of capacitor failure.

Depending on a particular characteristic, the electronic filter circuit is covered with metal braiding and a heat-shrinkable sheath or overmoulding, in order to guarantee the continuity of the electrical harness shielding.

Depending on a particular characteristic, one of the first or second terminations comprises a connector integrating said electronic circuit for filtering said signal. This positioning makes it easier for the person skilled in the art to integrate the electronic filter circuit into the harness.

According to a particular feature, the harness includes a fire-resistant case integrating the electronic filter circuit. This configuration is used as an alternative to positioning the filter in a connector of the electrical harness.

The invention also concerns a turbomachine comprising at least one rotor, a sensor capable of measuring a rotational speed of the rotor and a computer capable of receiving a measurement of said rotational speed, characterised in that it comprises an electrical harness according to one of the preceding claims, the first termination of which is connected to the rotational speed sensor and the second termination of which is connected to the computer. This type of turbomachine can be used for fire tests for example.

According to another characteristic, the turbomachine may comprise a low pressure body associated with a rotational speed N1 and a high pressure body associated with a rotational speed N2, comprising sensors capable of measuring the rotational speeds N1 and N2 and a computer capable of receiving a signal for measuring the speed N1 and/or N2, the first termination being connected to one of the sensors. Thus, the electronic filter circuit guarantees both signal filtering under normal conditions (no fire) and, in the event of fire, guarantees transmission of the engine speed signals for a minimum of five minutes.

The invention will be better understood and other details, characteristics and advantages of the invention will appear when reading the following description, which is given as a non-limiting example, with reference to the drawings.

DETAILED DESCRIPTION

Figure 1:
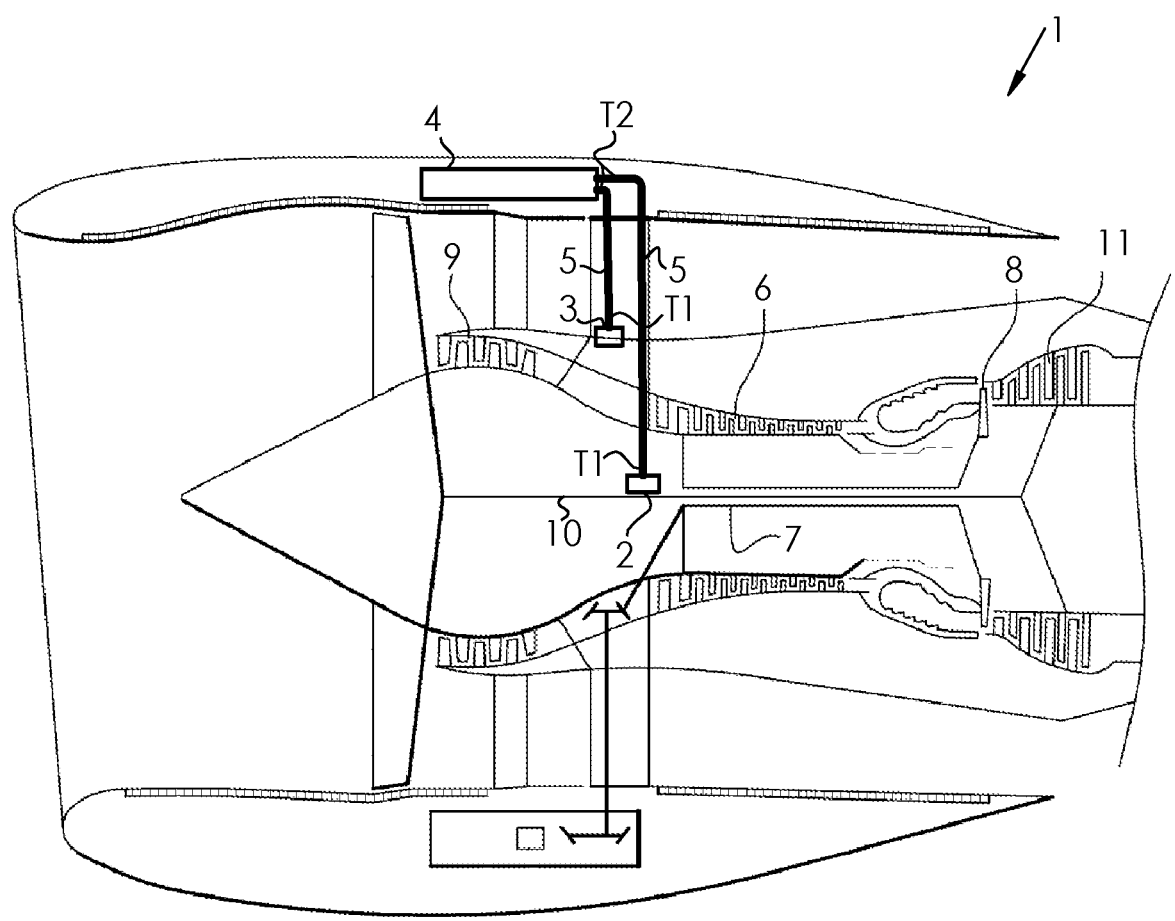
FIG. 1 is a simplified diagram of a turbomachine.

We first refer to FIG. 1 representing a double-body turbomachine 1. This turbomachine 1 comprises a low pressure body comprising a rotor whose rotational speed is called N1, and a high pressure body comprising a rotor whose rotational speed is called N2, the high pressure rotor and the low pressure rotor being coaxial and rotatable independently of each other. The turbomachine also comprises sensors 2 and 3 capable of measuring the rotational speeds N1 and N2, respectively, and a computer 4 capable of receiving the measurement signals for the N1 and N2 speeds. The high pressure housing consists of a high pressure compressor 6 and a high pressure turbine. The high pressure rotor comprises a shaft 7 connecting a plurality of high pressure compressor blade wheels to at least one high pressure turbine blade wheel 8. The low pressure housing consists of a low pressure compressor 9 and a low pressure turbine 11. The low pressure rotor comprises a shaft 7 connecting a plurality of low pressure compressor blade wheels to a plurality of blade wheels belonging to the low pressure turbine 8. As shown in FIG. 1, the high pressure shaft surrounds the low pressure shaft 10.

This turbomachine 1 also comprises two electrical harnesses 5 each comprising a first termination T1 connected to one of the sensors 2 or 3 and a second termination T2 connected to the computer 4. The electrical harnesses 5 have the particularity of being fire resistant and each includes an analog filter capable of filtering an electrical signal under normal conditions (no fire), and making it possible, in the event of fire, to guarantee transmission of the speed signals for a minimum duration of five minutes.

Figure 2:
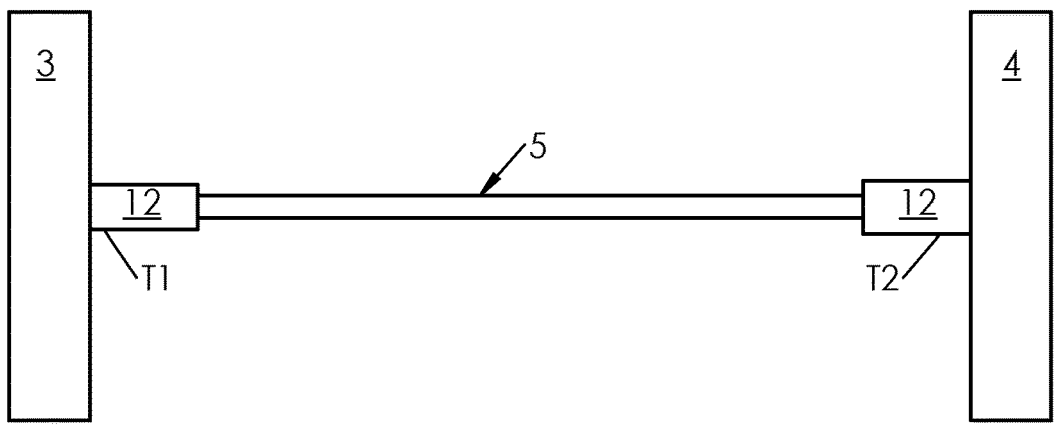
FIG. 2 is a diagram of the electrical harness according to an embodiment.
Figure 3:
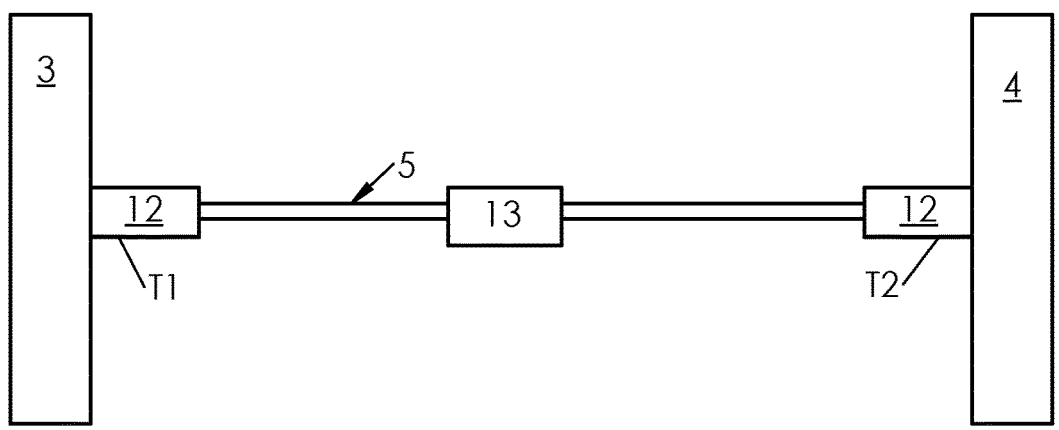
FIG. 3 is a diagram of the electrical harness according to an embodiment.
Figure 4:
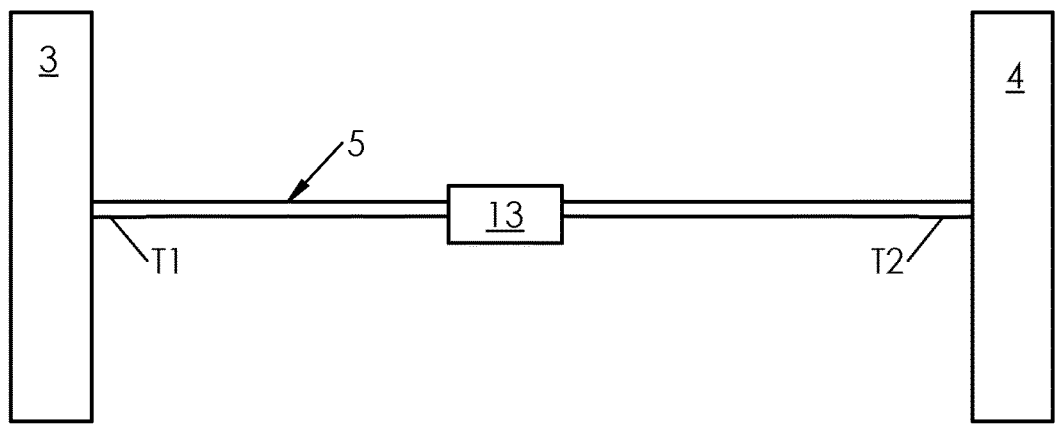
FIG. 4 is a diagram of the electrical harness according to an embodiment.

Thus, each electrical harness 5 comprises a first termination T1 connected to an apparatus capable of emitting an electrical signal (e.g. a sensor 3), and a second termination T2 connected to a signal processing apparatus (here a computer 4) as shown in FIG. 2, FIG. 3 and FIG. 4.

Depending on the design of FIG. 2 and FIG. 3, the electrical harness 5 may include a connector 12 at each termination T1 and T2.

In accordance with the embodiments in FIG. 3 and FIG. 4, the electrical harness 5 includes a fire-resistant housing 13.

According to the embodiment of FIG. 4, the first termination T1 is not disconnectable from sensor 3 and the second termination T2 is not disconnectable from computer 4. In general, the electrical harness 5 may include a T1 or T2 termination that can be disconnected or not disconnected from the device to which it is connected.

Each harness 5 includes an electronic circuit for filtering the signal. This circuit can be integrated into either the fire-resistant housing 13 shown in FIG. 3 or FIG. 4, or into one of the connectors 12 as shown in FIG. 2 and FIG. 3. The filter can be covered with metal braiding to provide shielding, and with a heat-shrinkable sleeve or overmoulding.

Positioning the filter in one of the connectors 12, which are harness support points, makes it easier for the person skilled in the art to integrate the filter into harness 5.

If the filter is integrated in a housing 13, the latter is at least partly metallic so that it is shielded. In this configuration, the connection of a harness cable to the housing 13 may or may not be disconnectable.

This electronic filter circuit comprises at least one electronic component (for example a resistor R or a capacitor C) associated with an operating temperature threshold, and a thermally triggered electrical interruption means connected in series or in parallel with said electronic component, said electrical interruption means being capable of changing from an open state in which a current cannot flow through it, to a closed state in which a current can flow through it, or vice versa from a closed state to an open state, from a triggering temperature less than or equal to the operating temperature threshold of said electronic component.

Thus, the failure of a component associated with an operating temperature threshold does not prevent the transmission of the electrical signal to computer 4.

Figure 5:
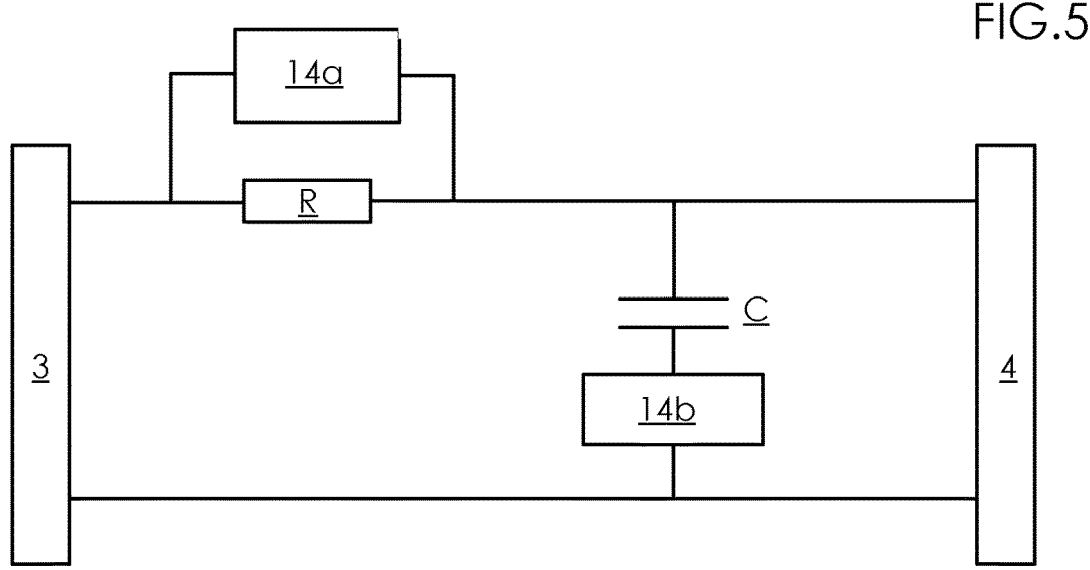
FIG. 5 is a simplified diagram of an electrical harness incorporating a low-pass analog filter.
Figure 6:
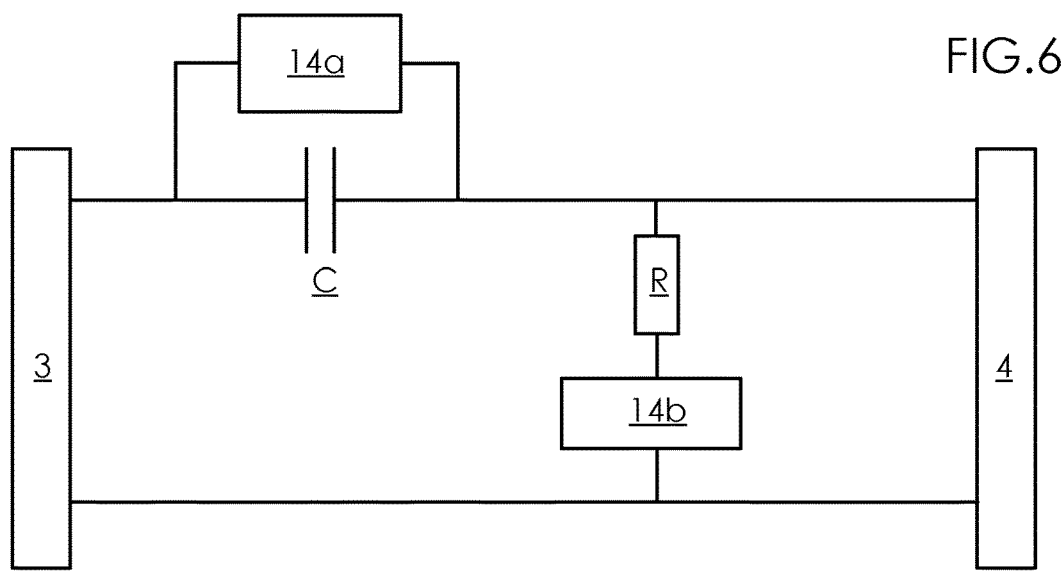
FIG. 6 is a simplified diagram of an electrical harness incorporating a high-pass analog filter.
Figure 7:
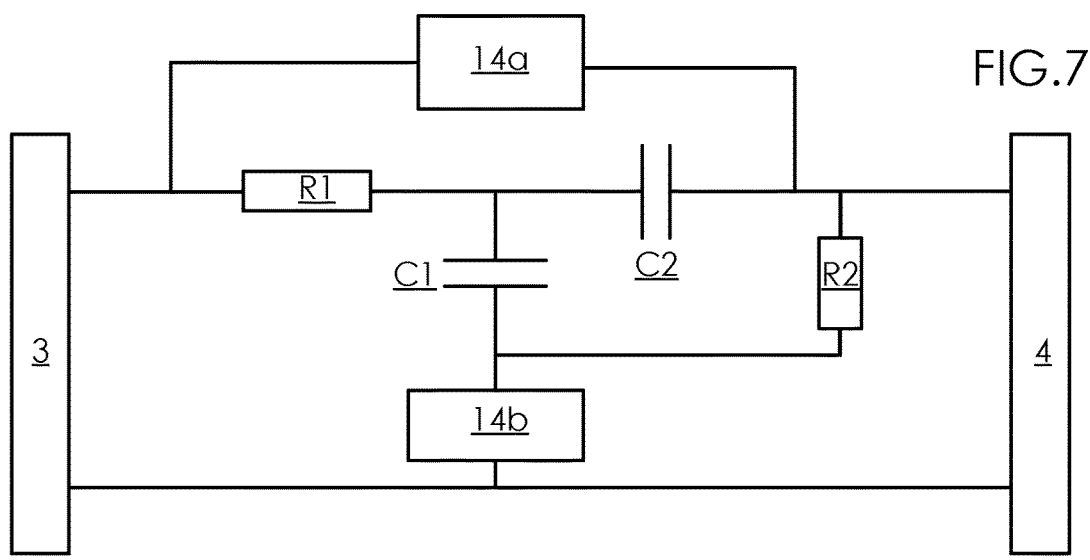
FIG. 7 is a simplified diagram of an electrical harness incorporating a band pass analog filter.

We refer to FIG. 5, FIG. 6 and FIG. 7 to illustrate three examples of embodiments, each time with a different type of filter integrated in the electrical harness 5.

According to the embodiment of FIG. 5, the filter integrated in the electrical harness 5 is a low-pass RC filter. It therefore contains two low-temperature electronic components: a resistor R and a capacitor C. Resistor R and capacitor C are connected in series. In case of fire, the failure modes of resistor R and capacitor C correspond to open or closed circuits. Each failure mode has an impact on the functional behaviour of the circuit:
- if resistor R behaves as an open circuit, there is a loss of the measured signal,
- if resistor R behaves like a closed circuit, the filter is no longer effective, but the signal transmission is maintained,
- if capacitor C behaves like an open circuit, the filter is no longer effective, but the signal transmission is maintained,
- if capacitor C behaves as a closed circuit, this generates a short circuit and there is a loss of the measured signal.

If the filter fails and a signal is transmitted, the transmitted signal is noisy. A double failure detection corresponding to the detection of a fire in conjunction with a false failure detection due to a noise peak on the transmitted signal is unlikely in practice. Failure modes that result in a loss of the measured signal are not practically acceptable, especially in the case of an N1 measurement signal. In the special case of a fire, the loss of filter functionality is acceptable, provided that the unfiltered signal remains usable for N1 speed measurement.

Indeed, the loss of the signal from the N1 speed sensor 3 is not acceptable because the computer 4 cannot regulate the engine without this measure. The loss of such a signal would result in serious malfunctions that could lead to loss of engine thrust control.

In order to combat the open circuit malfunction mode of resistor R, a thermally triggered electrical interrupting means is connected in parallel with resistor R, said thermal interrupting means being capable of changing from an open state in which current does not flow to a closed state in which current does flow. Thus, in the closed state, the means of electrical interruption allows the current to flow while the resistor R is in open circuit. The means of electrical interruption in this case is a thermal switch, e.g. a bimetallic strip 14*a*. The bimetallic strip 14*a* enables the resistor R to be short-circuited above a certain temperature, i.e. the tripping temperature. The thermal characteristics of the tripping of the bimetallic strip 14*a* are designed in such a way that the short-circuit of resistor R takes place before the failure of resistor R. For this purpose the temperature at which the bimetallic strip 14*a* trips to short-circuit resistor R is below the operating temperature threshold of resistor R.

According to a particular characteristic, the bimetallic strip 14*a* consists of materials (e.g. ceramic) whose melting temperature is higher than a maximum temperature found in fire conditions. The maximum temperature recorded in fire conditions is generally 1100° C.

According to a particular characteristic, the type of bimetallic strip used is preferably a sudden reversal bimetallic strip (also called snap bimetallic strip) because this type of bimetallic strip is the least sensitive to mechanical vibrations. Thus, bimetallic strip 14*a* is able to change position quickly from a certain temperature threshold.

In order to combat the closed-circuit failure mode of capacitor C, a thermally triggered electrical interrupting means is connected in series with the capacitor, said electrical interrupting means being capable of switching from a closed state to an open state in which the short circuit—which would have been induced by the closed-circuit failure mode of capacitor C—is avoided. This means of electrical interruption is, for example, a fuse 14*b* or a thermal circuit breaker. Fuse 14*b* allows disconnection of capacitor C above a certain temperature, thus compensating for the situation where capacitor C would short-circuit. Fuse 14*b* is designed to blow before capacitor C fails. The melting temperature of fuse 14*b* is therefore chosen lower than the operating temperature threshold of the capacitor C.

To avoid signal loss, bimetallic strip 14*a* must trip before the degradation of resistor R and fuse 14*b* must trip before the degradation of capacitor C. In case of fire, the temperature evolution being fast in low mass equipment such as an electrical harness, the respective tripping times of bimetallic strip 14*a* and fuse 14*b* will be separated by a relatively short time interval even if the respective tripping temperatures of these two electrical switching elements are quite different. For example, if fuse 14*b* trips (blows) before the bimetallic strip trips (flips), the RC circuit temporarily becomes a single resistor R circuit. Nevertheless, this situation will not have an impact on the engine regulation by computer 4. It is therefore not essential that bimetallic strip 14*a* and fuse 14*b* be selected so that their respective tripping temperatures are close to each other. These tripping temperatures will generally be in the range between 150° C. and 350° C., but higher values are possible if the operating temperature thresholds of resistor R and capacitor C exceed this range.

Other types of filters can be used (high pass, band pass . . . ) depending on the type of filtering desired.

FIG. 6 shows a harness 5 equipped with a high-pass RC filter. In this particular case, the failure modes are the same as in the case of the previously described RC low-pass filter but are reversed between resistor R and capacitor C. This time, the loss of the measurement signal corresponds to an open circuit failure of capacitor C or a closed circuit failure of resistor R (short circuit). In this case, a thermal switch is connected in parallel with capacitor C so that before capacitor C becomes open-circuited due to excessive temperature, the switch is switched from an open state to a closed state to allow electric current to flow through. In addition, a fuse 14*b* is connected in series with resistor R in order to prevent a short circuit in the event that resistor R behaves as a closed circuit due to excessively high temperatures.

FIG. 7 shows an electrical harness 5 equipped with a band pass filter. It takes the form of a low-pass RC filter connected in series with a high-pass RC filter. In the same way as for the filters described above, failure modes are managed by thermally triggered electrical interruption means. The open circuit failure mode of resistor R1 or capacitor C2 is controlled by a bimetallic strip 14*a* connected in parallel with these two components. The closed circuit failure modes of capacitor C1 and resistor R2 are controlled by a fuse 14*b*.

Thus, the embodiments described make it possible to integrate an electronic filter circuit that can contain low-temperature components such as a resistor or a capacitor, into a fire-resistant electrical harness connecting a sensor 3 and a computer 4, without compromising, in the event of fire, the transmission of the OFR signals carried by the electrical harness 5.

The invention claimed is:

1. Electrical harness for a turbomachine, the electrical harness comprising:
   a first termination connected to an apparatus capable of emitting an electrical signal,
   a second termination connected to a signal processing apparatus,
   an electronic signal filter circuit for filtering the electrical signal, said electronic signal filter circuit comprising at least one electronic component associated with an operating temperature threshold, and at least one thermally triggered electrical interruption means connected in series or in parallel with said at least one electronic component,
   said at least one thermally triggered electrical interruption means being configured to change between a closed state and an open state as a function of a tripping temperature, the closed state permitting flow of electric current and the open state not permitting flow of electric current through said at least one thermally triggered electrical interruption means,
   said tripping temperature lower than or equal to the operating temperature threshold associated with said at least one electronic component,
   wherein said at least one thermally triggered electrical interruption means is configured to ensure continuing electrical transmission between the first termination and the second termination when an operating temperature becomes higher than said tripping temperature.

2. Electrical harness according to claim 1, characterized in that the thermally triggered electrical interruption means is selected from the following list: thermal switch, fuse and thermal circuit breaker.

3. Electrical harness according to claim 1, characterized in that the electronic signal filter circuit comprises a resistor and a capacitor making a series RC circuit.

4. Electrical harness according to claim 2, characterized in that the electronic signal filter circuit comprises a resistor and a capacitor making a series RC circuit.

5. Electrical harness according to claim 3, characterised in that the resistor is connected in parallel with a thermal switch.

6. Electrical harness according to claim 3, characterized in that the capacitor is connected in series with a fuse or with a thermal circuit breaker.

7. Electrical harness according to claim 5, characterized in that the capacitor is connected in series with a fuse or with a thermal circuit breaker, the at least one thermally triggered electrical interruption means including one of the thermal switch, the fuse and the thermal circuit breaker.

8. Electrical harness according to claim 1, characterized in that one of the first termination and the second termination comprises a connector integrating the electronic signal filter circuit for filtering said electrical signal.

9. Electrical harness according to claim 2, characterized in that one of the first termination and the second termination comprises a connector integrating the electronic signal filter circuit for filtering said electrical signal.

10. Electrical harness according to claim 3, characterized in that one of the first termination and the second termination comprises a connector integrating the electronic signal filter circuit for filtering said electrical signal.

11. Electrical harness according to claim 5, characterized in that one of the first termination and the second termination comprises a connector integrating the electronic signal filter circuit for filtering said electrical signal.

12. Electrical harness according to claim 6, characterized in that one of the first termination and the second termination comprises a connector integrating the electronic circuit for filtering said signal.

13. Electrical harness according to claim 8, characterized in that the first termination comprises the connector integrating the electronic signal filter circuit.

14. Electrical harness according to claim 1, characterized in that the electrical harness comprises a fire-resistant housing incorporating the electronic signal filter circuit.

15. Electrical harness according to claim 2, characterized in that the electrical harness comprises a fire-resistant housing incorporating the electronic signal filter circuit.

16. Electrical harness according to claim 3, characterized in that the electrical harness comprises a fire-resistant housing incorporating the electronic signal filter circuit.

17. Electrical harness according to claim 5, characterized in that the electrical harness comprises a fire-resistant housing incorporating the electronic signal filter circuit.

18. Electrical harness according to claim 1, characterized in that the electronic signal filter circuit is covered with metal braiding and with a heat-shrinkable sheath or an overmoulding.

19. A turbomachine comprising:
   the electrical harness according to claim 1,
   at least one rotor,
   a sensor capable of measuring a rotational speed of the rotor, the sensor forming the apparatus the first termination is connected to, and
   a computer capable of receiving a measurement of said rotational speed, the computer forming the signal processing apparatus the second termination is connected to, the measurement of said rotational speed forming the electrical signal.

20. The turbomachine according to claim 19, the at least one rotor comprising a low pressure rotor and a high pressure rotor, the rotational speed being a rotational speed of the low pressure rotor or a rotational speed of the high pressure rotor.

* * * * *